US006492034B1

(12) United States Patent
Nazmy et al.

(10) Patent No.: US 6,492,034 B1
(45) Date of Patent: Dec. 10, 2002

(54) HEAT SHIELD

(75) Inventors: Mohamed Nazmy, Fislisbach (CH); Martin Scheu, Küssaberg (DE); Markus Staubli, Dottikon (CH)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/190,364

(22) Filed: Nov. 12, 1998

(30) Foreign Application Priority Data

Nov. 14, 1997 (DE) ........................................ 197 50 517

(51) Int. Cl.[7] .......................... B32B 5/02; B32B 15/14; B32B 15/18; B32B 19/06

(52) U.S. Cl. ....................... 428/608; 428/632; 428/566; 428/613; 428/621; 428/633; 428/680; 428/681; 428/34.4; 432/65; 376/287; 376/288

(58) Field of Search ............................ 182/47; 228/59; 376/287, 288, 289; 432/65; 219/460; 220/560.12, 592.09; 442/320; 428/547, 548, 549, 550, 566, 608, 613, 614, 621, 630, 631, 632, 637, 639, 660, 680, 681, 105, 113, 141, 174, 175, 280, 292, 296, 34.4, 34.5, 633

(56) References Cited

U.S. PATENT DOCUMENTS

| | | | | | |
|---|---|---|---|---|---|
| 3,127,668 | A | | 4/1964 | Troy | 29/182 |
| 3,469,297 | A | * | 9/1969 | Webber | 29/180 |
| 3,505,038 | A | * | 4/1970 | Luksch et al. | 29/183.5 |
| 3,910,039 | A | | 10/1975 | Fortini | 60/265 |
| 4,038,815 | A | | 8/1977 | Heitmann et al. | 60/39.08 |
| 4,069,171 | A | * | 1/1978 | Lemkey et al. | 252/454 |
| 4,075,364 | A | | 2/1978 | Panzera | 427/34 |
| 4,096,296 | A | * | 6/1978 | Galmiche et al. | 427/247 |
| 4,209,334 | A | * | 6/1980 | Panzera | 106/54 |
| 4,245,469 | A | | 1/1981 | Fortini et al. | 60/204 |
| 4,273,824 | A | | 6/1981 | McComas et al. | 428/256 |
| 4,338,380 | A | * | 7/1982 | Erickson et al. | 428/594 |
| 4,615,864 | A | * | 10/1986 | Dardi et al. | 420/437 |
| 4,629,397 | A | * | 12/1986 | Schweitzer | 416/96 R |
| 4,729,871 | A | * | 3/1988 | Morimoto | 419/2 |
| 4,838,031 | A | | 6/1989 | Cramer | 60/753 |
| 4,956,137 | A | * | 9/1990 | Dwivedi | 264/60 |
| 5,192,624 | A | * | 3/1993 | Morimoto | 428/596 |
| 5,578,386 | A | * | 11/1996 | Bell et al. | 428/614 |
| 5,665,479 | A | * | 9/1997 | Vandamme et al. | 428/613 |
| 6,025,282 | A | * | 2/2000 | Dewaegheneire et al. | 442/6 |
| 6,210,488 | B1 | * | 4/2001 | Bruce | 134/1 |

FOREIGN PATENT DOCUMENTS

| | | | | |
|---|---|---|---|---|
| DE | 3234376 | C1 | | 3/1984 |
| DE | 3248661 | A1 | | 7/1984 |
| DE | 3321149 | A1 | | 12/1984 |
| DE | 3327216 | C2 | | 2/1985 |
| DE | 3411924 | C2 | | 10/1985 |
| DE | 3446649 | C2 | | 6/1986 |
| DE | 3638658 | C1 | | 4/1988 |
| DE | 3718677 | C2 | | 12/1988 |
| DE | 4010076 | A1 | | 10/1990 |
| DE | 4122014 | | * | 5/1992 |
| DE | 4303135 | A1 | | 8/1994 |
| DE | 43 22 431 | | | 1/1995 |
| DE | 19623300 | A1 | | 12/1999 |
| FR | 2538507 | | | 6/1984 |
| GB | 1 545 783 | | | 5/1979 |

OTHER PUBLICATIONS

VDI Berichte 1151, "Effizienzsteigerung Durch Innovative Werkstofftechnik", Mar. 1995.

"Metallische Hochtemperaturfasern durch Schmelzextraktion—Herstellung, Eigenschaften und Anwendungen", Stephani, et al., VDI Verlag Werkstofftag, Mar. 1995.

* cited by examiner

*Primary Examiner*—Deborah Jones
*Assistant Examiner*—Michael LaVilla
(74) *Attorney, Agent, or Firm*—Burns, Doane, Swecker & Mathis, L.L.P.

(57) ABSTRACT

In a heat shield (1), in particular for combustion chambers and for thermal fluid flow machines, the heat shield consists of a feltlike material (3) composed of compressed and sintered intermetallic fibers. Advantageously, the intermetallic fibers consist of an iron based or nickel based intermetallic phase.

9 Claims, 1 Drawing Sheet

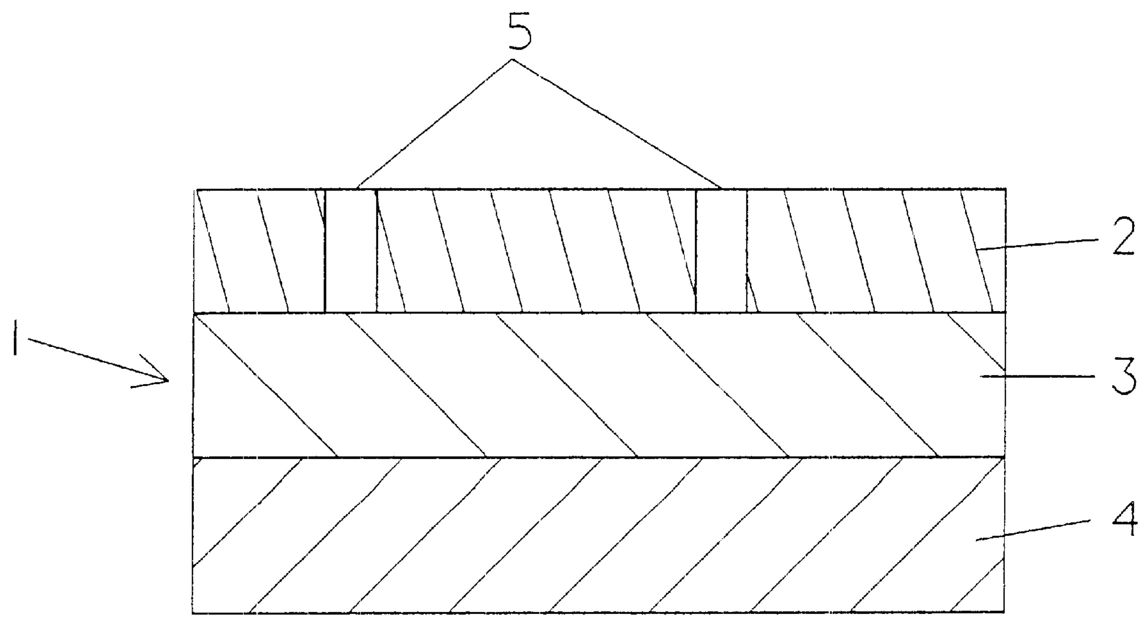
5
2
1
3
4

HEAT SHIELD

FIELD OF THE INVENTION

The invention is directed to from a heat shield.

BACKGROUND OF THE INVENTION

Heat shields are known, for example for use in thermal fluid flow machines and combustion chambers. Usually, these heat shields consist of a carrier material and a thermal insulation layer which is connected to the carrier material by means of a binder layer. This binder layer is applied in the vacuum plasma process; this limits the size of the processable parts due to the size of the vacuum chamber and makes manufacture more costly. A further problem is that at application temperatures exceeding 900° C. the binder layer usually fails and the thermal insulation layer falls off. This leads to a failure of the heat shield.

DE 3327216 A has disclosed a thermal protection layer consisting of a metallic felt which is infiltrated and filled with zirconium oxide by means of CVD. This gives rise to a compact firm thermal protection layer. The metallic felt serves as supporting structure for the zirconium oxide coating. The disadvantage of this protection layer involves the high production costs and the inadequate properties with respect to heat resistance and oxidation resistance, in particular of the supporting structure. Moreover, the thermal protection layer can be cooled only with great difficulties, i.e. by means of large cooling air consumption.

SUMMARY OF THE INVENTION

Accordingly, one object of the invention, is to provide, in the case of a heat shield of the above mentioned type, a novel cheap and efficient heat shield.

According to the invention, this is achieved by providing a heat shield, comprising a feltlike material composed of compressed and sintered intermetallic fibers.

Accordingly, the core of the invention is that the heat shield is made from a felt-like material composed of compressed and sintered intermetallic fibers.

The, advantages of the invention can be seen is that as a result of the use of intermetallic fibers, the cooling air required to cool the heat shield can be significantly reduced. The feltlike material based on intermetallic fibers can be used at temperatures exceeding 1000° C., since the intermetallic fibers have a high heat resistance, a high oxidation resistance and advantageous thermal conduction properties. Moreover, these properties can be regulated by the selected intermetallic phase in controlled fashion and can be adapted to the respective conditions. As a result of the porosity of the feltlike material, a very efficient cooling consuming little cooling air is made possible.

It is advantageous additionally to apply a thermal insulation layer on the feltlike material. This adheres without special intermediate layers to the feltlike material and additionally reduces the cooling requirement and accordingly increases the efficiency of the heat shield in addition.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

A diagrammatic illustrative embodiment of the invention is represented.

The sole FIGURE shows a partial longitudinal cross section through a heat shield. Only the elements which are essential to an understanding of the invention are shown.

DESCRIPTION OF THE PREFERRED EMBODIMENTS

Referring now to the drawing, a heat shield 1 is represented in the sole FIGURE. Such a heat shield can be used in combustion chambers, thermal fluid flow machines such, as gas turbines, etc. The heat shield includes a carrier material 2, a feltlike material 3 which is disposed thereon and which is composed of intermetallic fibers, and a thermal insulation layer 4. The carrier material 2, which is usually metallic, may have cooling channels 5. The thermal insulation layer 4 is made from for example, zirconium oxide which has been partially or fully stabilized with yttrium oxide, calcium oxide or magnesium oxide.

The feltlike material 3 has been disclosed, for example, in "VDI Report 1151, 1995, Metallic High Temperature Fibers by Fusion Extraction—Manufacture, Properties and Applications, Stephani et al., pages 175 et seq.". In that publication, fibers are manufactured in the fusion extraction process and the fibers are compressed and sintered. The feltlike material formed in this way is used as filter and as catalyst carrier.

According to the invention, this feltlike material is now manufactured from intermetallic fibers. To this end, use is advantageously made of intermetallic iron based on nickel based phases. These have a high heat resistance, a high oxidation resistance and advantageous thermal conduction properties. Moreover, the abovementioned properties can be regulated within a wide range by the selection of an appropriate intermetallic phase. Moreover, the feltlike material composed of intermetallic fibers can be manufactured very cheaply.

The porosity of the feltlike material can be regulated by the parameters of the process of manufacture, such as operating pressure and sinter parameters. An advantage of this porous structure is that the feltlike material can very efficiently be cooled directly through its open porosity. As a result of the porosity, the feltlike material has a large internal surface, which simplifies the transport of waste heat.

The feltlike material composed of intermetallic fibers is now secured on the carrier material. The carrier material serves as securing and stabilizing means for the feltlike material. The thermal insulation layer is applied to the feltlike material; this takes place by means of known processes such as, for example, plasma spraying. The thermal insulation layer has outstanding adhesion to the rough and porous surface of the feltlike material.

The thermal insulation layer reduces the temperature of the surface; the porous feltlike material serves for cooling. If the thermal insulation layer fails, that is to say if it is no longer available, the remaining feltlike material is at all times still sufficient by reason of the outstanding properties with respect to heat resistance, oxidation resistance and advantageous thermal conduction properties of the intermetallic phases. Even the feltlike material without a thermal insulation layer can thus be used as heat shield; in this case, however, the consumption of cooling air is somewhat greater as compared with the additional use of a thermal insulation layer.

Of course, the invention is not restricted to the illustrative embodiment which has been shown and described. The carrier material can also be omitted if the feltlike material has an adequate inherent strength due to an appropriate selection of the material and of the porosity.

Obviously, numerous modifications and variations of the present invention are possible in the light of the above teachings. It is therefore to be understood that within the scope of the appended claims the invention may be practiced otherwise than as specifically described herein.

What is claimed is:

1. A heat shield comprising:

a carrier material having a first surface that is one or more of the group consisting of continuous and substantially planar;

a layer of openly porous material disposed directly on the first surface of the carrier material, the porous material consisting of compressed and sintered intermetallic fibers; and a thermal insulation layer disposed directly on a surface of the porous material layer, the thermal insulation layer consisting of partially or fully stabilized zirconium oxide.

2. The heat shield of claim 1, wherein the carrier material comprises cooling channels in communication with the porous material layer.

3. The heat shield of claim 1, wherein the carrier material is metallic.

4. The heat shield of claim 1, wherein the intermetallic fibers comprise an iron based or nickel based intermetallic phase.

5. A heat shield exposed to an oxidizing environment and temperatures exceeding 900° C., the heat shield comprising:

a carrier material having a first surface that is one or more of the group consisting of continuous and substantially planar;

a component of the heat shield formed of an intermetallic felt consisting of intermetallic fibers and disposed adjacent the first surface of the carrier material; and a thermal insulation layer consisting of partially or fully stabilized zirconium oxide, the thermal insulation layer disposed on a surface of the intermetallic felt, the intermetallic felt between the carrier material and the thermal insulation layer.

6. The heat shield as claimed in claim 5, wherein the intermetallic fibers comprise an iron based or nickel based intermetallic phase.

7. The heat shield as claimed in claim 5, wherein the intermetallic felt has an open porosity whereby the heat shield is cooled.

8. The heat shield of claim 5, wherein the carrier material comprises cooling channels in communication with the intermetallic felt.

9. The heat shield of claim 5, wherein the carrier material is metallic.

* * * * *